United States Patent
Lee et al.

(10) Patent No.: US 7,603,079 B2
(45) Date of Patent: Oct. 13, 2009

(54) MOBILE TERMINAL FOR DIGITAL BROADCASTING RECEPTION AND METHOD FOR STORING DIGITAL BROADCASTING DATA

(75) Inventors: Tae-Wook Lee, Gumi-si (KR); Sung-Gu Kim, Gumi-si (KR); Yong-Chul Yoon, Gumi-si (KR); Jong-Min Lee, Gwangju-si (KR); Bong-Seok Choi, Daegu (KR)

(73) Assignee: Samsung Electronics Co., Ltd (KR)

( * ) Notice: Subject to any disclaimer, the term of this patent is extended or adjusted under 35 U.S.C. 154(b) by 578 days.

(21) Appl. No.: 11/249,648

(22) Filed: Oct. 13, 2005

(65) Prior Publication Data

US 2006/0116161 A1   Jun. 1, 2006

(30) Foreign Application Priority Data

Nov. 30, 2004   (KR) .................. 10-2004-0099578

(51) Int. Cl.
*H04H 40/00* (2008.01)
(52) U.S. Cl. ................ 455/3.06; 455/414.4; 455/412.1; 455/552.1
(58) Field of Classification Search ....... 455/3.01–3.06, 455/412.2, 414.1, 450, 550.1, 517, 412.1, 455/414.4, 420, 552.1, 466, 556.1; 386/68, 386/83; 348/14.02; 729/39, 142
See application file for complete search history.

(56) References Cited

U.S. PATENT DOCUMENTS

| 7,257,314 | B2 * | 8/2007 | Asada et al. | 386/94 |
| 2004/0001701 | A1 * | 1/2004 | Roper | 725/53 |
| 2004/0052504 | A1 * | 3/2004 | Yamada et al. | 386/68 |
| 2004/0109675 | A1 * | 6/2004 | Tsukidate | 386/83 |
| 2004/0226035 | A1 * | 11/2004 | Hauser, Jr. | 725/9 |

FOREIGN PATENT DOCUMENTS

| CN | 1496122 | 5/2004 |
| EP | 1 398 947 | 3/2004 |
| KR | 1020040093840 | 11/2004 |

* cited by examiner

*Primary Examiner*—John J Lee
(74) *Attorney, Agent, or Firm*—The Farrell Law Firm, LLP

(57) ABSTRACT

A digital broadcasting data reception unit receives digital broadcasting data. A multimedia module parses the digital broadcasting data into video and audio data to output the video and audio data. A terminal control unit receives the digital broadcasting data from the digital broadcasting data reception unit when it is transmitted to the multimedia module, and parses the received digital broadcasting data into the video and audio data. A memory unit stores the video and audio data into which the digital broadcasting data is parsed by the terminal control unit according to a control operation of the terminal control unit.

12 Claims, 6 Drawing Sheets

MOBILE TERMINAL FOR DIGITAL BROADCASTING RECEPTION AND METHOD FOR STORING DIGITAL BROADCASTING DATA

PRIORITY

This application claims priority to an application entitled "MOBILE COMMUNICATION TERMINAL FOR DIGITAL BROADCASTING RECEPTION AND METHOD FOR STORING DIGITAL BROADCASTING DATA", filed in the Korean Intellectual Property Office on Nov. 30, 2004 and assigned Serial No. 2004-99578, the entire contents of which are incorporated herein by reference.

BACKGROUND OF THE INVENTION

1. Field of the Invention

The present invention relates generally to a mobile terminal, and more particularly to a mobile terminal for digital broadcasting reception and a method for storing digital broadcasting data in real time.

2. Description of the Related Art

Conventionally, digital broadcasting provides users with broadcasting service of high quality video and audio as compared to conventional analog broadcasting. An apparatus for receiving digital broadcasting includes a mobile terminal, a receiver for vehicles and home, etc., and can be mounted into a mobile terminal. Interest in digital broadcasting service has recently increased with the development of digital broadcasting and mobile communication technology. More specifically, there has been an increased interest in digital multimedia broadcasting (DMB) via mobile terminals.

The DMB service is a broadcasting service through which the users can view and listen to various digital broadcasting programs on multiple channels by means of a personal portable receiver or a vehicle receiver while on the move.

FIG. 1 illustrates a system for implementing a digital broadcasting service. The system includes a data transmission center 10, a satellite 20, and receivers, for example, a mobile terminal 30, a receiver 40 for vehicle use, and a receiver 50 for home use.

The data transmission center 10 compresses and modulates digital broadcasting data (e.g., image, voice, and data signals, etc.), and then transmits the compressed and modulated digital broadcasting data to the satellite 20.

The satellite 20 receives and amplifies the signal from the data transmission center 10, and frequency-converts the signal to transmit the converted signal to the ground.

The receivers 30, 40 and 50 receive the signal from the satellite 20, and demodulate and decompress the received signal to recover and output the original signal.

According to the rapid development of digital broadcasting technology, users can view and listen to clear digital broadcasting without signal noise in vehicles, even when moving at high speeds.

One of the advantages of digital broadcasting is better channel efficiency. In analog broadcasting, only one program is broadcast through one physical channel. With digital broadcasting, however, a plurality of programs can be simultaneously broadcast through one physical channel. As a result, the digital broadcasting service can provide an increased number of programs. Therefore, a need exists for providing program information that allows viewers to easily select a desired program. Services for providing program information are referred to as electronic program guide (EPG) services.

The EPG service provides viewers with various types of broadcasting program information from a broadcasting station (or a cable broadcasting service operator (SO)), such that they can refer to the program information.

When a user desires to store digital broadcasting data in real time while viewing and listening to digital broadcasting using a mobile terminal, the mobile terminal includes a high-performance multimedia module and may not fully store various digital broadcasting data desired by the user because of limited memory capacity.

SUMMARY OF THE INVENTION

Accordingly, the present invention has been designed to solve the above and other problems occurring in the prior art. Therefore, it is an aspect of the present invention to provide a mobile terminal for digital broadcasting reception and method that store digital broadcasting data in real time.

It is another aspect of the present invention to provide a mobile terminal for digital broadcasting reception and a method that effectively stores digital broadcasting data.

A mobile terminal according to an embodiment of the present invention can accomplish the above and other aspects of the present invention. The mobile terminal includes a digital broadcasting data reception unit for receiving digital broadcasting data; a multimedia module for parsing the digital broadcasting data into video and audio data to output the video and audio data; a terminal control unit for receiving the digital broadcasting data from the digital broadcasting data reception unit when it is transmitted to the multimedia module, and parsing the received digital broadcasting data into the video and audio data, when a user of the mobile terminal makes a request; and a memory unit for storing the video and audio data into which the digital broadcasting data is parsed by the terminal control unit according to a control operation of the terminal control unit.

The above and other aspects of the present invention can be accomplished by a method for storing digital broadcasting data in a mobile terminal for digital broadcasting data reception including a multimedia module for parsing and outputting externally received digital broadcasting data. The method includes receiving the digital broadcasting data; transmitting the received digital broadcasting data to the multimedia module and a control unit for controlling overall operation of the mobile terminal in response to a user's request; and outputting video and audio data of the transmitted digital broadcasting data from the multimedia module, parsing the transmitted digital broadcasting data into the video and audio data in the control unit, and storing the video and audio data in a separate memory.

Preferably, the method further includes, when a playback request for reproducing digital broadcasting data stored in the memory is made, detecting video and audio data of corresponding digital broadcasting data stored in the memory; and transmitting the detected video and audio data to the multimedia module and reproducing the detected video and audio data.

BRIEF DESCRIPTION OF THE DRAWINGS

The above and other aspects and advantages of the present invention will be more clearly understood from the following detailed description taken in conjunction with the accompanying drawings, in which.

DETAILED DESCRIPTION OF THE PREFERRED EMBODIMENTS

Figure 1:
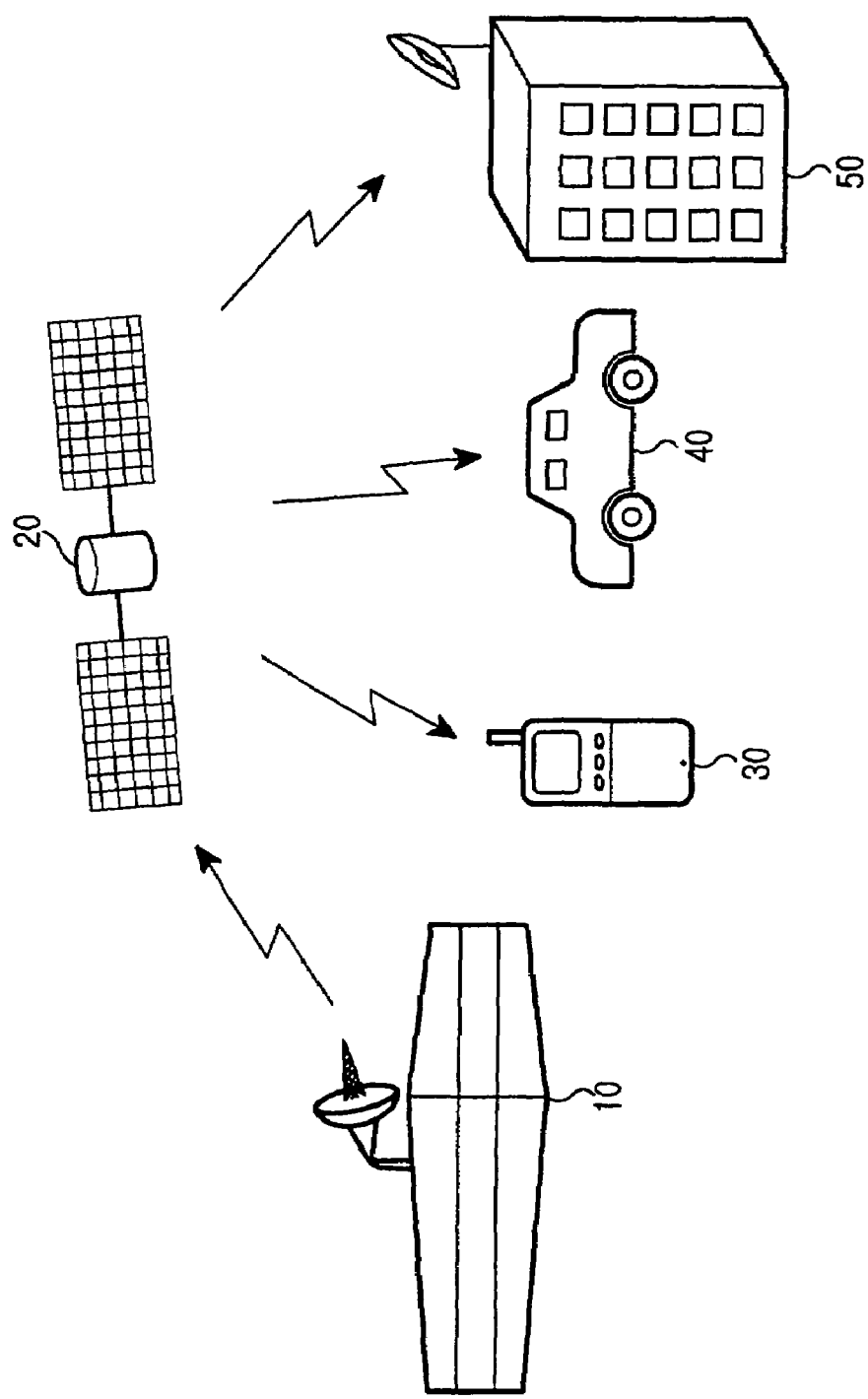
FIG. 1 illustrates a system for implementing a digital broadcasting service.

Embodiments of the present invention will be described in detail herein below with reference to the accompanying drawings. In the drawings, the same or similar elements are denoted by the same reference numerals even though they are depicted in different drawings. Additionally, in the following description, a detailed description of known functions and configurations incorporated herein will be omitted for conciseness.

Figure 2:
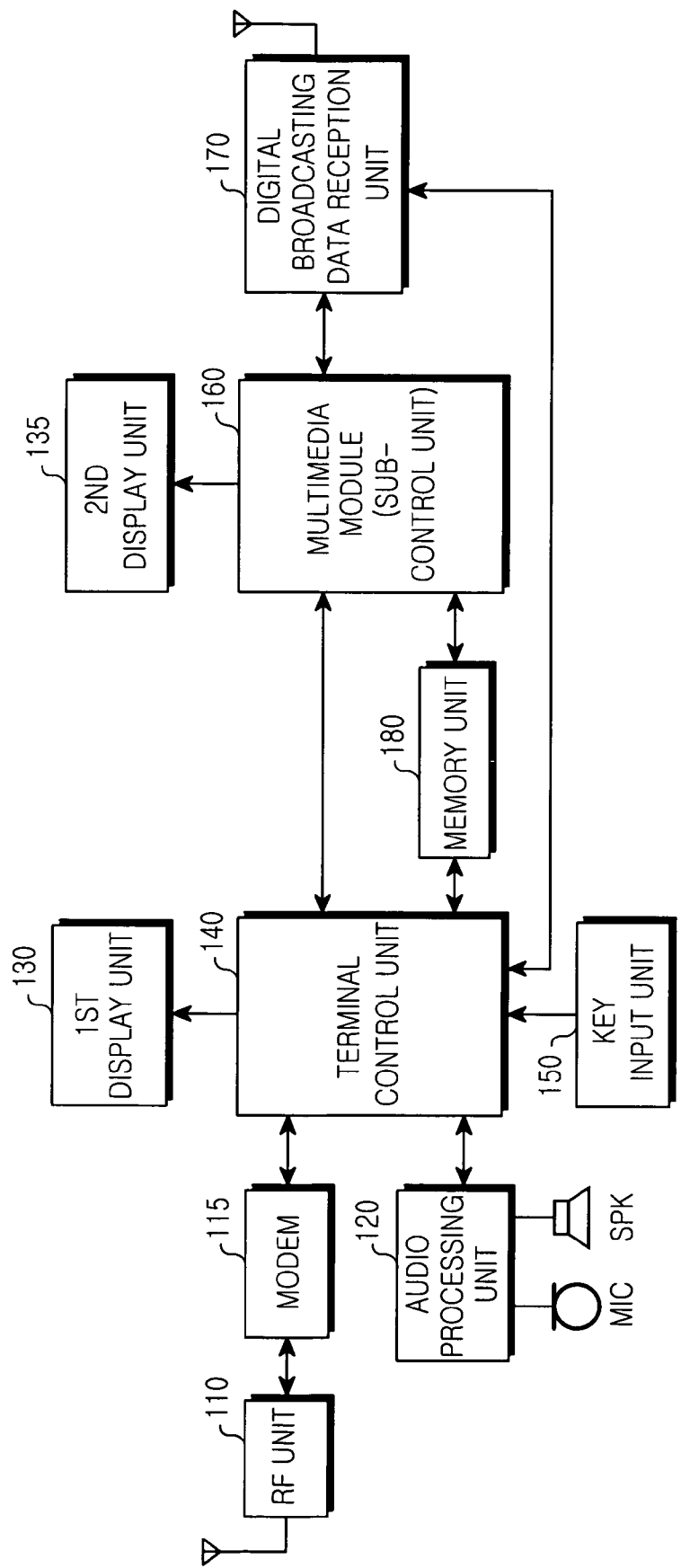
FIG. 2 is a block diagram illustrating a mobile terminal for digital broadcasting reception in accordance with an embodiment of the present invention.
Figure 3A:
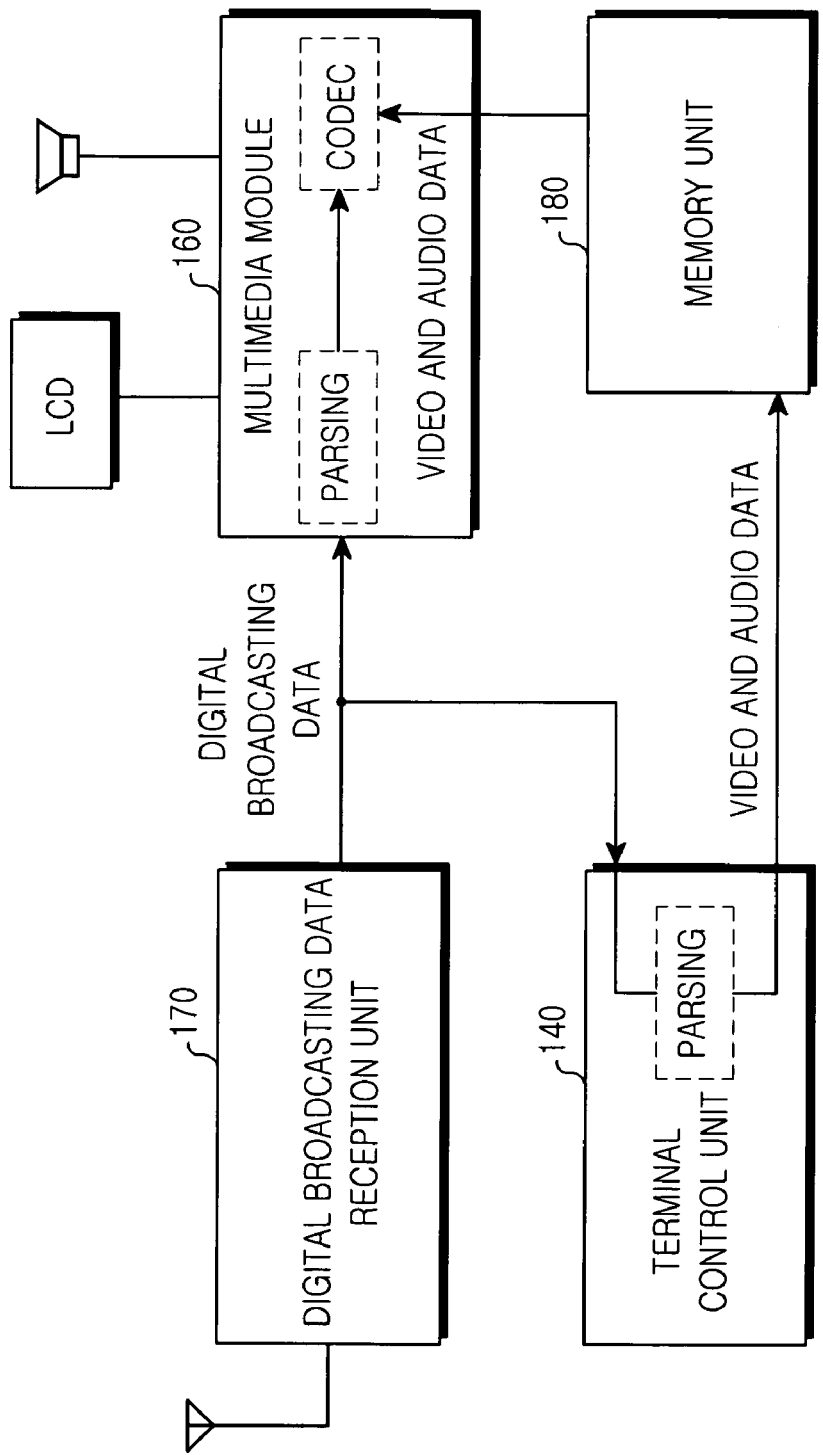
FIG. 3A is a block diagram illustrating details of some components in the mobile terminal of FIG. 2.

FIG. 2 is a block diagram illustrating a mobile terminal for digital broadcasting reception in accordance with an embodiment of the present invention, and FIG. 3A is a block diagram illustrating details for some of its components.

As illustrated in FIG. 2, the mobile terminal includes a radio frequency (RF) unit 110, a modulator-demodulator (MODEM) 115, an audio processing unit 120, a first display unit 130, a second display unit 135, a terminal control unit 140, a key input unit 150, a multimedia module 160, a digital broadcasting data reception unit 170, and a memory unit 180.

Referring to FIGS. 2 and 3A, the RF unit 110 is responsible for transmitting and receiving voice data, text data, image data, and control data according to a control operation of the terminal control unit 140. The RF unit 110 is a comprehensive component collection of a high frequency processor, an intermediate frequency processor, and a baseband processor (not shown). The RF unit 110 includes an RF transmitter for up converting and amplifying a frequency of a signal to be transmitted, an RF receiver for low-noise amplifying a received signal and down converting a frequency of the received signal, etc. (not shown).

The MODEM 115 includes a transmitter for encoding and modulating the signal to be transmitted, a receiver for demodulating and decoding the received signal, etc. (not shown).

The audio processing unit 120 converts a digital audio signal received from the MODEM 115 into an analog audio signal through an audio coder-decoder (CODEC) to reproduce the analog audio signal, and converts an analog audio signal generated from a microphone into a digital audio signal through the audio CODEC to transmit the digital audio signal to the MODEM 115. The CODEC may be separately provided or may be included in the terminal control unit 140.

The first and second display units 130 and 135 can use a liquid crystal display (LCD). In this case, the first and second display units 130 and 135 can include a memory capable of storing image data and an LCD element. When the LCD is implemented using a touch-screen system, the first and second display units 130 and 135 can serve as an input unit.

The first display unit 130 displays information associated with the overall function of the mobile terminal including a portable telephone function. The first display unit 130 displays EPG information for guiding a digital broadcasting program.

The second display unit 135 displays an image signal output from the multimedia module 160. The first and second display units 130 and 135 can be separately configured in terms of hardware. One speaker and one LCD may be used in conjunction with each of the first and second display units 130 and 135.

The terminal control unit 140 can be implemented by QUALCOMM's mobile station modem (MSM) 6500 or 6550 chip, etc., if a mobile terminal includes the features of a mobile telephone and controls the overall operation of the mobile terminal for digital broadcasting reception in accordance with embodiments of the present invention.

When a user request (e.g., a real-time recording request for digital broadcasting data through a key input) is entered, the terminal control unit 140 receives digital broadcasting data from the digital broadcasting data reception unit 170 when the digital broadcasting data is transmitted to the multimedia module 160, and parses the received digital broadcasting data into video and audio data as illustrated in FIG. 3A. The terminal control unit 140 controls the memory unit 180 to store the parsed digital broadcasting data, the video and audio data. The digital broadcasting data is split into transport stream (TS) packets according to a TS packet size such that an external digital broadcasting system's transmitter (not shown) can load the digital video and audio data on a transfer channel. The split TS packets then are multiplexed and modulated, and the modulated multiplexed TS packets are transmitted in the form of an RF signal.

When a playback request for reproducing the digital broadcasting data stored in the memory unit 180 is entered by a user (e.g., key input), the terminal control unit 140 controls an operation for detecting video and audio data of the digital broadcasting data corresponding to the playback request from the memory unit 180, and outputting the detected video and audio data to the multimedia module 160.

Figure 3B:
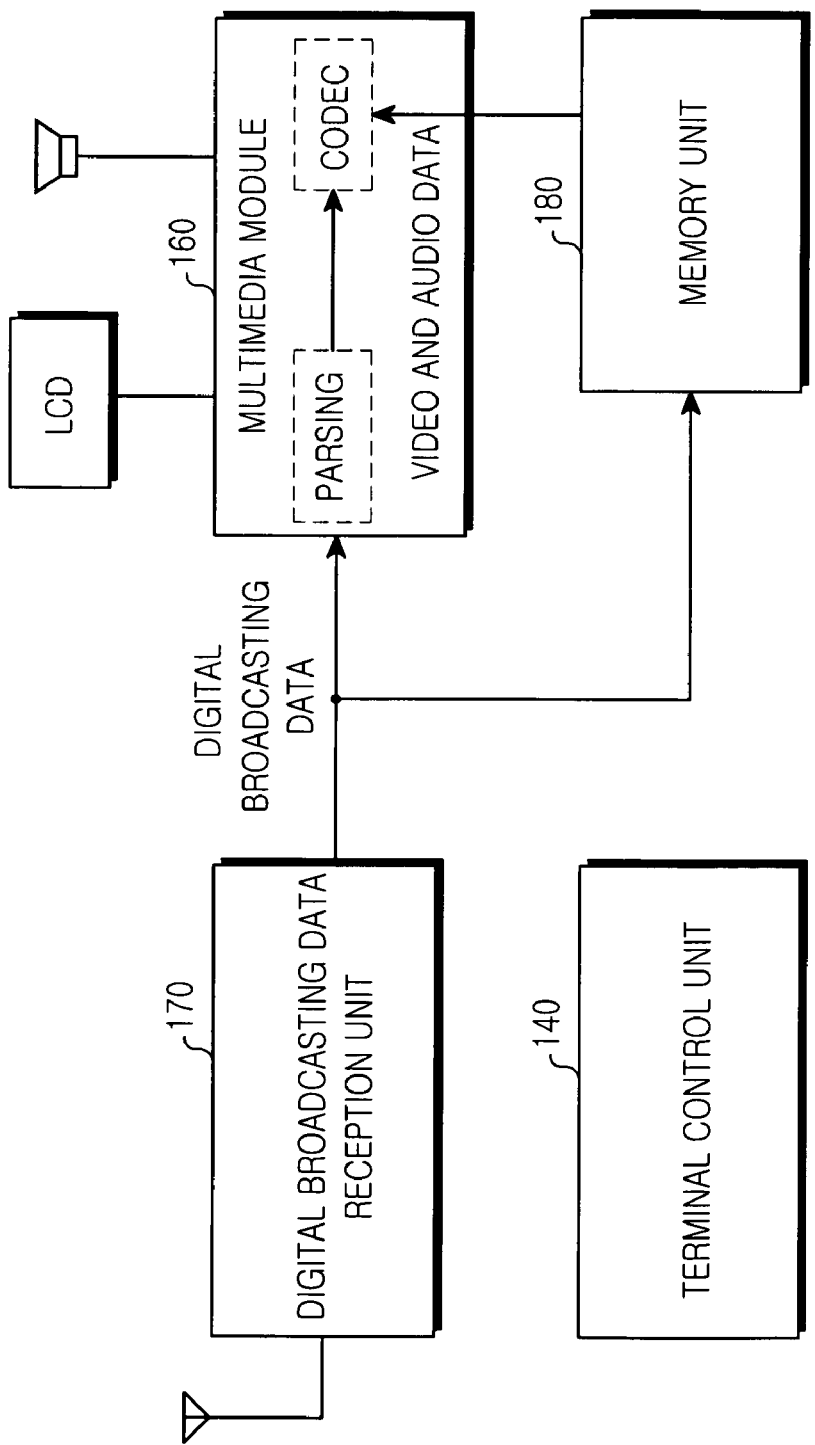
FIG. 3B is a block diagram illustrating details of some components in the mobile terminal of FIG. 2 in accordance with an alternative embodiment of the present invention.

When the user makes a request for storing digital broadcasting data in real time, the terminal control unit 140 outputs a command signal for storing the digital broadcasting data to the digital broadcasting data reception unit 170 in response to the request as illustrated in FIG. 3B. The digital broadcasting data reception unit 170 can transmit the digital broadcasting data to the multimedia module 160 and simultaneously store the digital broadcasting data in the memory unit 180.

FIG. 3B is a block diagram illustrating details of some components provided in the mobile terminal of FIG. 2. It is preferred that the memory unit 180 stores digital broadcasting data directly input from the digital broadcasting data reception unit 170 in a separate storage area. When the user makes a playback request for reproducing digital broadcasting data, the multimedia module 160 parses the digital broadcasting data stored in the memory unit 180 to output or reproduce video and audio data.

The key input unit 150 has a key matrix structure (not shown), and includes character keys, number keys, function keys, and an external volume key. The key input unit 150 outputs, to the terminal control unit 140, an input signal corresponding to a key input by the user. More specifically, the key input unit 150 can include a key for executing or releasing digital broadcasting reception and a key for recording digital broadcasting.

The multimedia module (serving as a sub-control unit) 160 performs a function of a digital broadcasting control unit, parses the digital broadcasting data transmitted from the digital broadcasting data reception unit 170 into video and audio data, and outputs multimedia information to be provided to the user through the speaker and the second display unit 135. In this case, when the first display unit 130 and one LCD configure the second display unit 135, the multimedia information can be output to the LCD. The multimedia module 160 can be implemented with an H.264 CODEC multimedia processor.

The digital broadcasting data reception unit 170 receives digital broadcasting data through an antenna and then outputs the received digital broadcasting data to the multimedia module 160. When a user request occurs, the digital broadcasting data reception unit 170 outputs the received digital broadcasting data to the terminal control unit 140 according to a control operation of the terminal control unit 140.

The memory unit 180 stores information associated with the overall function of the mobile terminal for digital broadcasting reception. The memory unit 180 stores the video and audio data into which the digital broadcasting data is parsed by the terminal control unit 140. Alternatively, the memory unit 180 can store, in a separate storage area, unparsed digital broadcasting data transmitted from the digital broadcasting data reception unit 170 to the multimedia module 160 according to a control operation of the terminal control unit 140. The multimedia module 160 parses the digital broadcasting data stored in the memory unit 180 when the user makes a playback request for reproducing digital broadcasting data, such that the video and audio data serving as the parsed digital broadcasting data is reproduced.

The memory unit 180 can be implemented by a first memory for storing information associated with the overall function of the mobile terminal, and a second memory for storing information associated with a digital broadcasting service.

Operation of the mobile terminal for digital broadcasting reception will be described with reference to FIG. 2. When the user sets a signal transmission mode after a dialing operation through the key input unit 150, the terminal control unit 140 senses the set signal transmission mode, controls the MODEM 115 to process received dial information, and controls the RF unit 110 to convert the processed information into an RF signal and output the RF signal. Subsequently, when an opposite subscriber generates a response signal, the terminal control unit 140 senses the response signal through the RF unit 110 and the MODEM 115. The user performs a communication function by means of a voice communication path established through the audio processing unit 120.

When a signal reception mode is performed, the terminal control unit 140 senses the signal reception mode through the MODEM 115 and controls the audio processing unit 120 to generate a ringtone. Subsequently, when the user makes a response, the terminal control unit 140 senses the response. The user performs a communication function by means of a voice communication path established through the audio processing unit 120.

Although an example of voice communication in the signal transmission and reception modes has been described above, a data communication function for communicating packet data and image data can be done as well. When an idle mode or character or text communication is entered/performed, the terminal control unit 140 controls the first display unit 130 to display character or text data processed by the MODEM 115.

The mobile terminal with the above-mentioned structure performs the portable telephone function or the multimedia function according to the user's manipulation through the key input unit 150. The user can view and listen to digital broadcasting through the second display unit 135. The user can identify the portable telephone function or digital broadcasting program guide information (that is, EPG information) through the first display unit 130.

Figure 4:
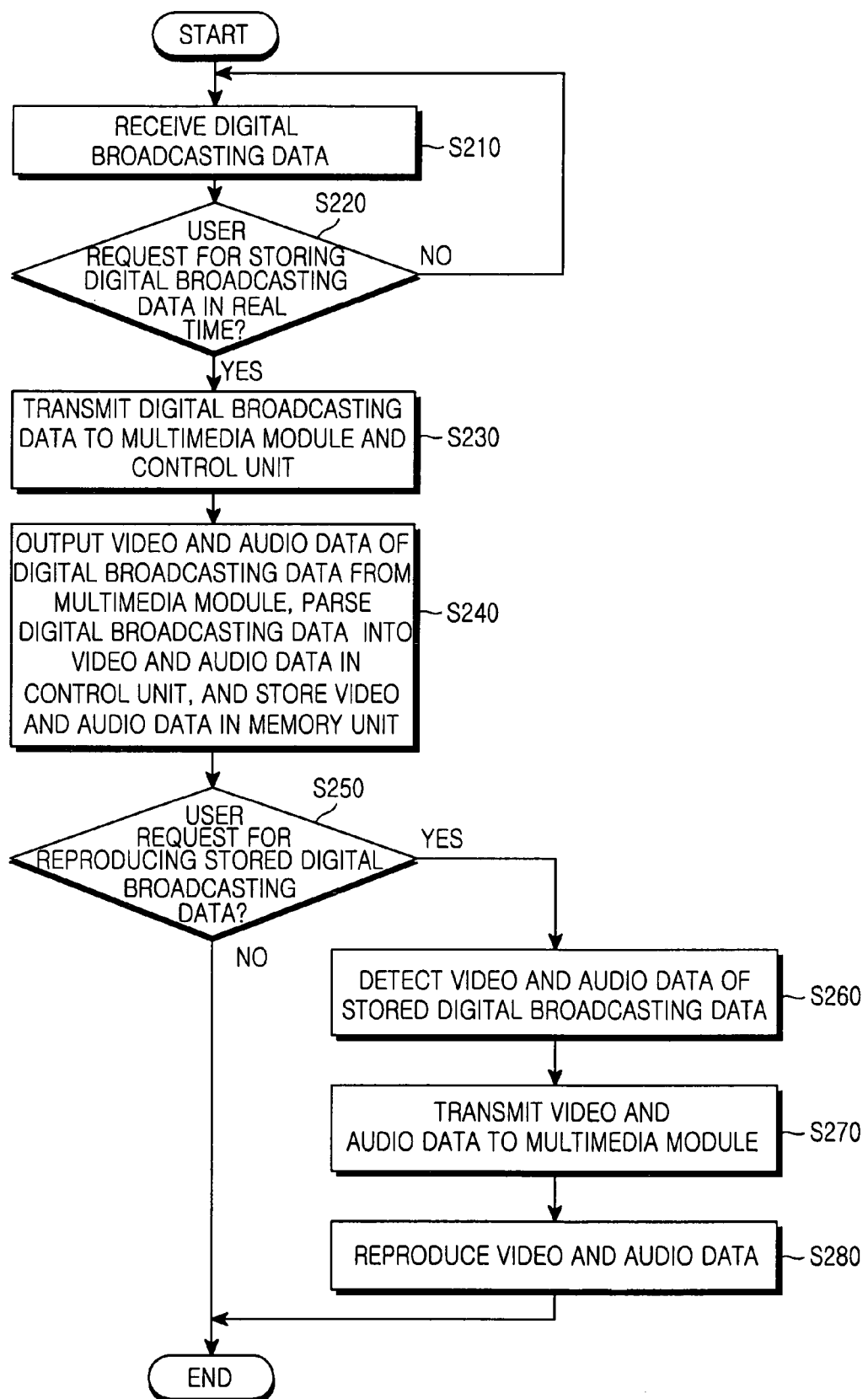
FIG. 4 is a flow diagram illustrating a procedure for storing digital broadcasting data in accordance with an embodiment of the present invention.

FIG. 4 is a flow diagram illustrating a procedure for storing digital broadcasting data in accordance with an embodiment of the present invention.

Referring to FIGS. 2, 3A, and 4, the terminal control unit 140 receives digital broadcasting data through the digital broadcasting data reception unit 170 at step S210. The received digital broadcasting data is transmitted to the multimedia module 160. The multimedia module 160 parses the digital broadcasting data into video and audio data, and outputs the video and audio data to the speaker and the second display unit 135.

The terminal control unit 140 determines if the user of the mobile terminal makes a request for storing digital broadcasting data in real time (for example, if the user of the mobile terminal inputs a key for recording digital broadcasting data in real time through the key input unit 150) at step S220. At this point, the terminal control unit 140 receives a reservation time through the key input unit 150 from the user and can perform a reservation recording function as well as store the digital broadcasting in real time.

When the user makes the request for storing digital broadcasting data in real time, the terminal control unit 140 receives the digital broadcasting data from the digital broadcasting data reception unit 170 when it is transmitted to the multimedia module 160, in response to the request at step S230.

The multimedia module 160 parses or separates the transmitted digital broadcasting data into video and audio data according to a control operation of the terminal control unit 140, and outputs the video and audio data to the speaker and the second display unit 135 at step S240. Substantially simultaneously, the terminal control unit 140 parses or separates the received digital broadcasting data into the video and audio data and controls the memory unit 180 to store the video and audio data (step S240). Here, parsing the digital broadcasting data into video and audio data and storing the video and audio data can reduce the digital broadcasting data size to accommodate limited memory capacity.

In step S230, the terminal control unit 140 can control the memory unit 180 to directly store the digital broadcasting data when the digital broadcasting data is transmitted from the digital broadcasting data reception unit 170 to the multimedia module 160. In this case, the memory unit 180 requires large memory capacity because the digital broadcasting data of large-capacity TS packets must be directly stored without being parsed. As a result, it is preferred that the digital broadcasting data is parsed into the video and audio data, and the video and audio data is stored in the memory unit 180 through the process of step S240. Through the process of steps S210 to S240, the user can record the digital broadcasting in real time while viewing and listening to the digital broadcasting.

The terminal control unit 140 determines if the user makes a playback request for reproducing the stored digital broadcasting data at step S250. If the user does not make the playback request, the terminal control unit 140 terminates operation of the mobile terminal.

However, if the user does make the playback request, the terminal control unit 140 detects video and audio data of corresponding digital broadcasting data stored in the memory unit 180 at step S260. The terminal control unit 140 transmits the detected video and audio data to the multimedia module 160 at step S270.

The multimedia module 160 then outputs the transmitted video and audio data to the speaker and the second display unit 135 through the CODEC at step S280. At this point, the multimedia module 160 can reduce unnecessary load by outputting, through the CODEC, the video and audio data into which the terminal control unit 140 parses the digital broadcasting data.

Figure 5:
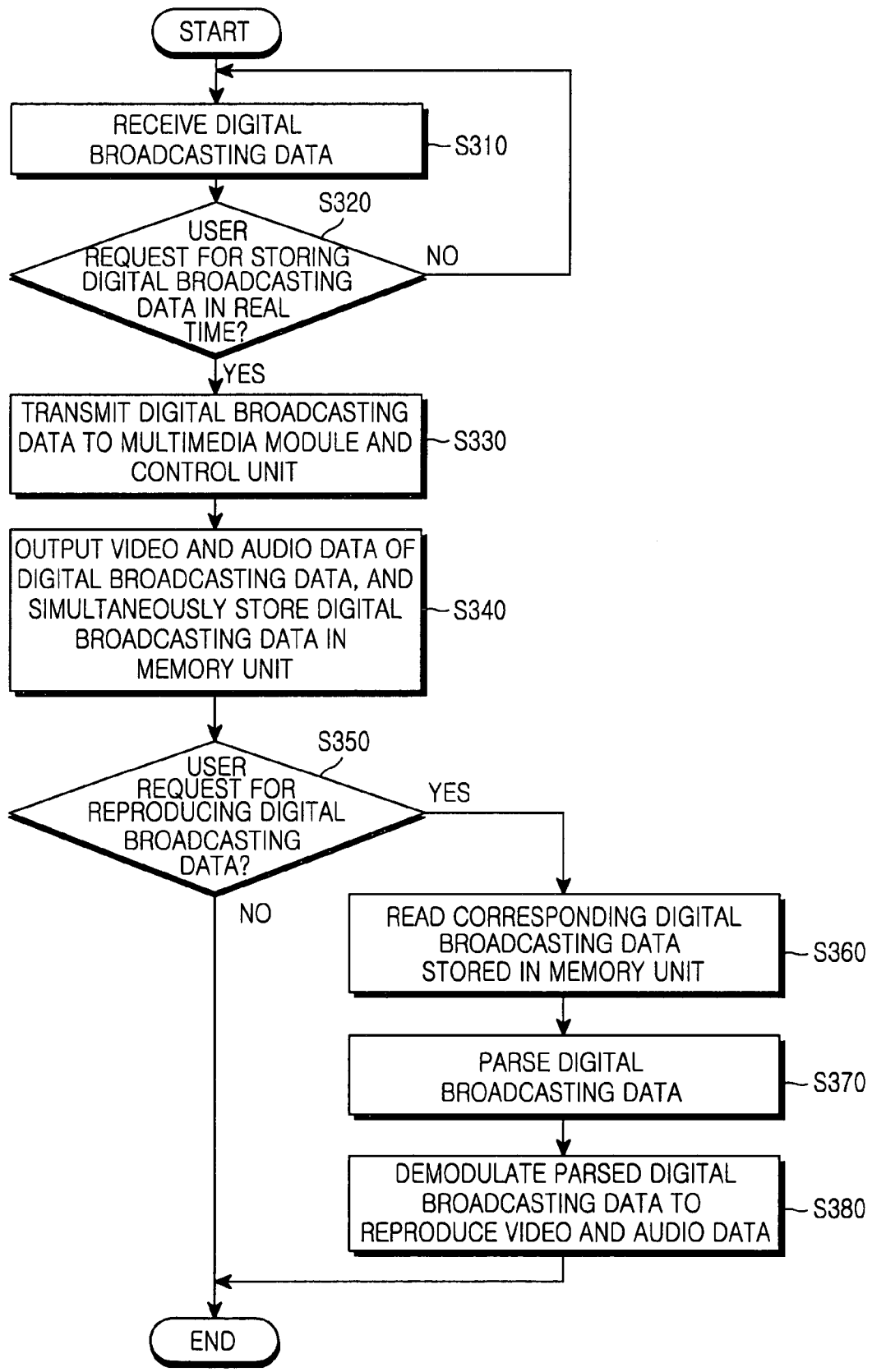
FIG. 5 is a flow diagram illustrating a procedure for storing digital broadcasting data in accordance with an alternative embodiment of the present invention.

FIG. 5 is a flow diagram illustrating a procedure for storing digital broadcasting data in accordance with an alternative embodiment of the present invention.

Referring to FIGS. 2, 3B, and 5, the mobile terminal receives digital broadcasting data through the digital broadcasting data reception unit 170 at step S310. The received digital broadcasting data is transmitted to the multimedia module 160. The multimedia module 160 parses the digital broadcasting data into video and audio data, and outputs the video and audio data to the speaker and the second display unit 135.

The terminal control unit 140 determines if the user of the mobile terminal requested storing digital broadcasting data in real time (for example, if the user of the mobile terminal inputs a key for recording digital broadcasting data in real time through the key input unit 150) at step S320. At this point, the terminal control unit 140 receives a reservation time through the key input unit 150 from the user and can perform a reservation recording function as well as store the digital broadcasting in real time.

When the user requests storing digital broadcasting data in real time, the terminal control unit 140 outputs a command signal for storing the digital broadcasting data to the digital broadcasting data reception unit 170 in response to the request. In response to the command signal, the digital broadcasting data reception unit 170 substantially simultaneously transmits the digital broadcasting data to the multimedia module 160 and the memory unit 180 at step S330.

The multimedia module 160 parses or separates the transmitted digital broadcasting data into video and audio data, and outputs the video and audio data to the speaker and the second display unit 135 through the CODEC. At substantially the same time, the terminal control unit 140 stores a digital broadcasting data output from the digital broadcasting data reception unit 170 in the memory unit 180 at steps 340.

The terminal control unit 140 determines if the user makes a playback request for reproducing the stored digital broadcasting data at step S350. If the user does not make the playback request, the terminal control unit 140 terminates operation of the mobile terminal.

If the playback request is present, the terminal control unit 140 controls the multimedia module 160 to read corresponding digital broadcasting data stored in the memory unit 180 at step S360.

The multimedia module 160 parses the read digital broadcasting data into video and audio data at step S370, and demodulates and reproduces the parsed digital broadcasting data at step S380.

As apparent from the above description, the present invention enables the user to store digital broadcasting data in real time while viewing and listening to digital broadcasting.

The present invention can parse digital broadcasting data and store small-capacity video and audio data, such that the digital broadcasting data can be efficiently stored in a limited memory space.

Although, in the present application, certain embodiments for a mobile terminal include features of a mobile telephone (i.e. the present invention) have been disclosed for illustrative purposes, it is possible to apply to all the digital broadcasting reception apparatuses. That is, those skilled in the art will appreciate that various modifications, additions and substitutions are possible, without departing from the scope of the present invention. Therefore, the present invention is not limited to the above-described embodiments, but is defined by the following claims, along with their full scope of equivalents.

What is claimed is:

1. A mobile terminal for digital broadcasting reception, comprising:
   a digital broadcasting data reception unit for receiving digital broadcasting data;
   a multimedia module for parsing the digital broadcasting data into first video data and first audio data to output the video and audio data;
   a terminal control unit for receiving the digital broadcasting data from the digital broadcasting data reception unit when the digital broadcasting data is transmitted to the multimedia module, and parsing the received digital broadcasting data into second video data and second audio data when a user of the mobile terminal makes a request; and
   a memory unit for storing the first video data and the first audio data into which the digital broadcasting data is parsed by the terminal control unit according to the user request and a control operation of the terminal control unit.

2. The mobile terminal according to claim 1, further comprising:
   a key input unit for receiving a manipulation signal of the mobile terminal user.

3. The mobile terminal according to claim 1, wherein when a playback request for reproducing digital broadcasting data stored in the memory unit is made according to a user request, the terminal control unit controls an operation for detecting video and audio data of the digital broadcasting data corresponding to the playback request from the memory unit and outputting the detected video and audio data to the multimedia module.

4. The mobile terminal according to claim 2, wherein when a playback request for reproducing digital broadcasting data stored in the memory unit is made according to a user request, the terminal control unit controls an operation for detecting video and audio data of the digital broadcasting data corresponding to the playback request from the memory unit and outputting the detected video and audio data to the multimedia module.

5. The mobile terminal according to claim 1, wherein the terminal control unit transmits the digital broadcasting data received from the digital broadcasting data reception unit to the multimedia module and substantially simultaneously stores the digital broadcasting data in the memory unit.

6. The mobile terminal according to claim 5, wherein when a playback request for reproducing digital broadcasting data is made, the multimedia module reads and parses corresponding digital broadcasting data stored in the memory unit according to a control operation of the terminal control unit.

7. A method for storing digital broadcasting data in a mobile terminal for digital broadcasting data reception, the mobile terminal including a multimedia module for parsing and outputting externally received digital broadcasting data, the method comprising:
   receiving the digital broadcasting data;
   transmitting the received digital broadcasting data to the multimedia module and a control unit for controlling overall operation of the mobile terminal in response to a user's request; and
   outputting first video data and first audio data of the transmitted digital broadcasting data from the multimedia module, parsing the transmitted digital broadcasting data into second video data and second audio data in the control unit, and storing the first video data and the first audio data in a separate memory according to the user's request.

8. The method of claim 7, further comprising:

when a playback request for reproducing digital broadcasting data stored in the memory is made according to a user request, detecting video and audio data of corresponding digital broadcasting data stored in the memory; and transmitting the detected video and audio data to the multimedia module and reproducing the detected video and audio data.

9. The method of claim 7, further comprising transmitting the digital broadcasting data to the multimedia module and substantially simultaneously storing the digital broadcasting data in the memory.

10. The method of claim 9, further comprising reading digital broadcasting data stored in the memory and parsing the data into the video and audio data when a user requests the reproducing of the digital broadcasting data.

11. The method of claim 7, further comprising selecting a program to record from an electronic program guide.

12. The method of claim 7, wherein parsing further comprises separating the digital broadcasting data into the video and the audio data.

* * * * *

UNITED STATES PATENT AND TRADEMARK OFFICE
CERTIFICATE OF CORRECTION

PATENT NO. : 7,603,079 B2
APPLICATION NO. : 11/249648
DATED : October 13, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 790 days.

Signed and Sealed this

Fifth Day of October, 2010

David J. Kappos
*Director of the United States Patent and Trademark Office*